United States Patent [19] Wientjens

[11] 4,184,951

[45] Jan. 22, 1980

[54] METHOD AND APPARATUS FOR CLEANING LIQUIDS

[76] Inventor: Gerardus T. A. M. Wientjens, Kleefseweg 34, Ottersum, Netherlands

[21] Appl. No.: 921,655

[22] Filed: Jul. 3, 1978

[30] Foreign Application Priority Data

Jul. 7, 1977 [NL] Netherlands ........................ 7707572

[51] Int. Cl.$^{2}$ ........................ B01D 33/02; B01D 33/36

[52] U.S. Cl. ........................................ 210/78; 210/382

[58] Field of Search ...................... 210/78, 360 R, 369, 210/380 R, 380 L, 382

[56] References Cited

U.S. PATENT DOCUMENTS 2,454,112 11/1948 Woodson ........................ 210/382 X
2,481,979 9/1949 Colley ............................ 210/382 X
3,451,550 6/1969 Cox ........................................ 210/78

FOREIGN PATENT DOCUMENTS 236837 1/1962 Australia .................................... 210/78

*Primary Examiner*—William A. Cuchlinski, Jr.
*Attorney, Agent, or Firm*—Sprung, Felfe, Horn, Lynch & Kramer

[57] ABSTRACT

A method of cleaning a liquid which is conducted centrally and from the top in a strainer provided with a closed casing within a centrifugal drum. The bottom of said strainer is formed by a screen and is shut off at the top by a cover comprising screen holes and a central opening. During the centrifuging of the liquid a fluid jet is directed to the rotating cover in situ of the screen holes, while the water emerging from the screen holes is collected in a housing surrounding the drum and discharged.

2 Claims, 4 Drawing Figures

METHOD AND APPARATUS FOR CLEANING LIQUIDS

The present invention relates to a method and an apparatus for cleaning liquids, in particular the removal of insoluble dirt from a cleaning liquid which is used in chemical cleaning installations.

There are two groups of dirt which are substantially absent in the laundry or the dry cleaner's but which are of daily concern for the industrial cleaner.

In the first place it concerns the fluffs, which broken fibres are released in large quantities during the cleaning of e.g. polishing cloths and blankets.

Furthermore sand, metal particles and other fine dirt, which is released during the cleaning of polishing cloths, overalls, military uniforms etc.

The conventional pin catching device then constitutes an inconvenient drawback. It is meant as coarse filter in the suction pipe of the pump for the cleaning liquid.

The fluffs are mainly captured in the pin catching device, so that the pump cannot be clogged thereby. If there is question of larger quantities of fluffs, the pin catching device gets immediately clogged, so that the pump circulation is impeded. The drawbacks are clear: the cleaning becomes inferior. By insufficient slow running of the drum of the cleaning installation, the centrifuge motor may be burnt, thus excluding automatic operation.

Sand and other insoluble dirt arrives in the distillation boiler, is precipitated in situ and enormously slows down the distillation. The regular draining of the distillation boiler helps partly. However, this requires a shutdown of the machine during the boiling out of the residue. The boiled out residue always contains a large quantity of sand and dirt which is precipitated in the storage vessels and then it can no longer be removed practically so that the discharge of residue mixed with dirt is an expensive affair.

It is the object of the present invention to eliminate the above drawbacks in that the liquid is conducted centrally and from above in a strainer provided with a closed casing inside a centrifugal drum, the bottom of said strainer being formed by a screen and which is shut off at the top by a cover provided with screening holes and a central opening, whereby during the centrifuging of the liquid, the fluid jet is directed to the rotating cover in situ of the screening holes and the water emerging via said holes is collected in a housing surrounding the drum and is discharged.

The apparatus according to the invention comprises a centrifuge, within the drum of which there is mounted a strainer having a closed casing, the bottom of said strainer being formed by a screen and which is shut off at the top by a cover provided with screen openings, while there is disposed in the housing surrounding the centrifugal drum an inlet terminating centrally in the cover, as well as comprising a supply nozzle for supplying a pressurized fluid which is directed to the screen holes, in which housing there are accommodated furthermore the drive means for the centrifugal drum.

Clogging of the openings covered for instance with wire screen in the removable cover can now be avoided by a nozzle, through which at a specific pressure, during the rotation of the drum, a jet of cleaning liquid can be squirted through the meshes of the gauze of the above openings, so that said openings remain open and the water can freely flow therethrough unimpeded and devoid of fluffs and the like. The dimensions of the nozzle have been established empirically with respect to the width, the squirting speed of the cleaning liquid and the speed of the drum.

The invention will be explained, by way of example, with reference to the accompanying drawings wherein:

FIG. 1 diagrammatically shows a vertical cross-section of an installation according to the invention;

FIG. 2 likewise is a vertical cross-section wherein the distribution of insoluble dirt and cleaning liquid is indicated;

Figure 1:
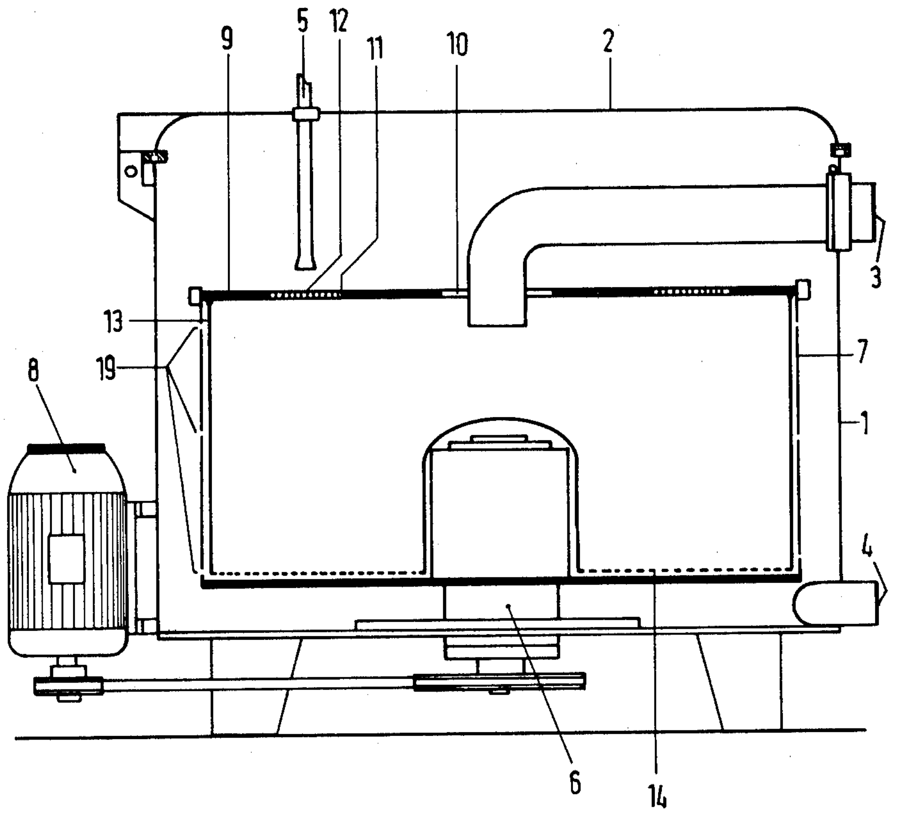
Figure 2:
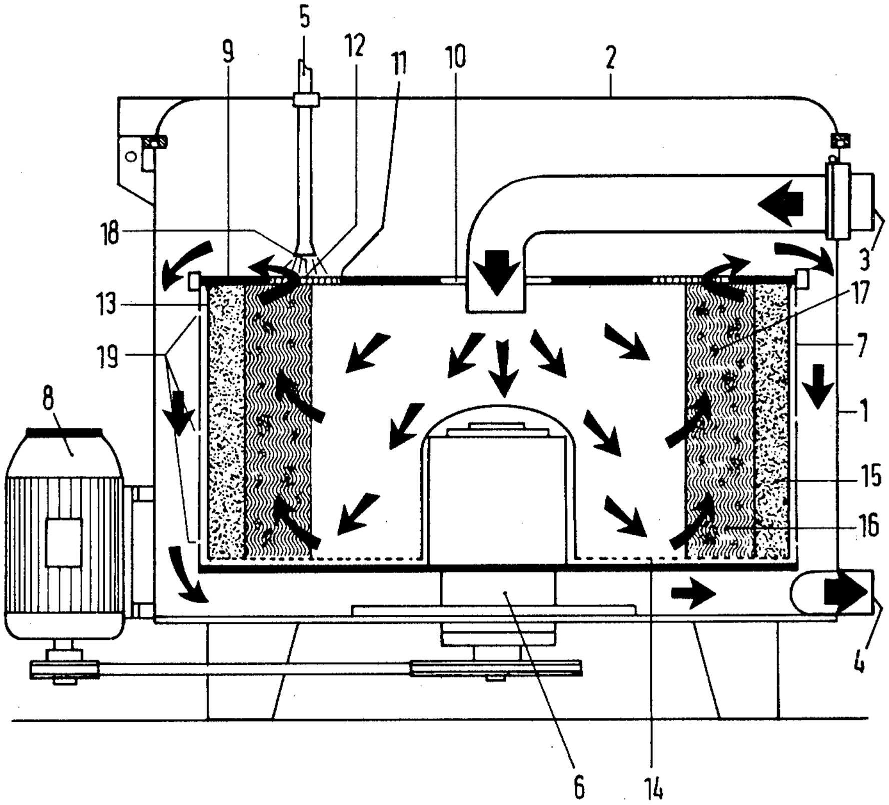
Figure 3:
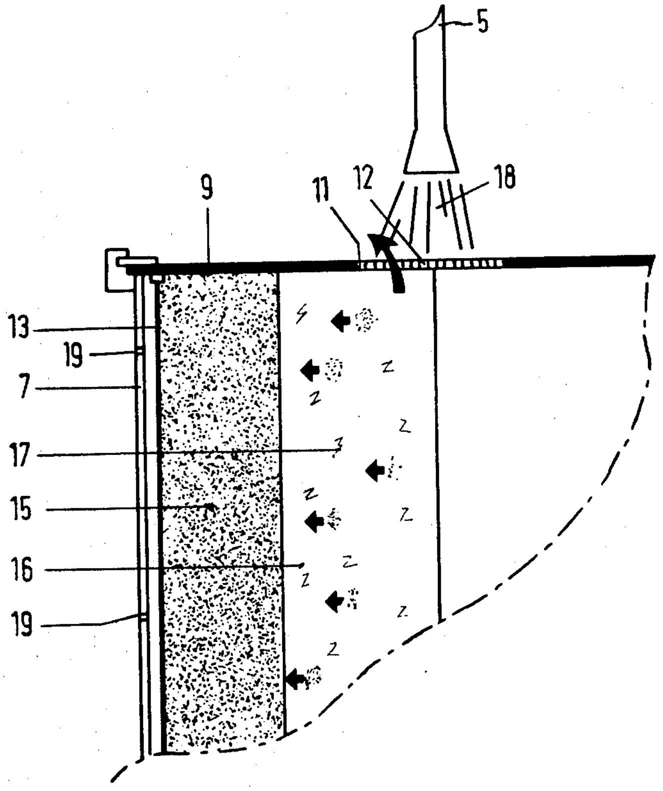
FIG. 3 is a detail of the installation according to FIG. 2.
Figure 4:
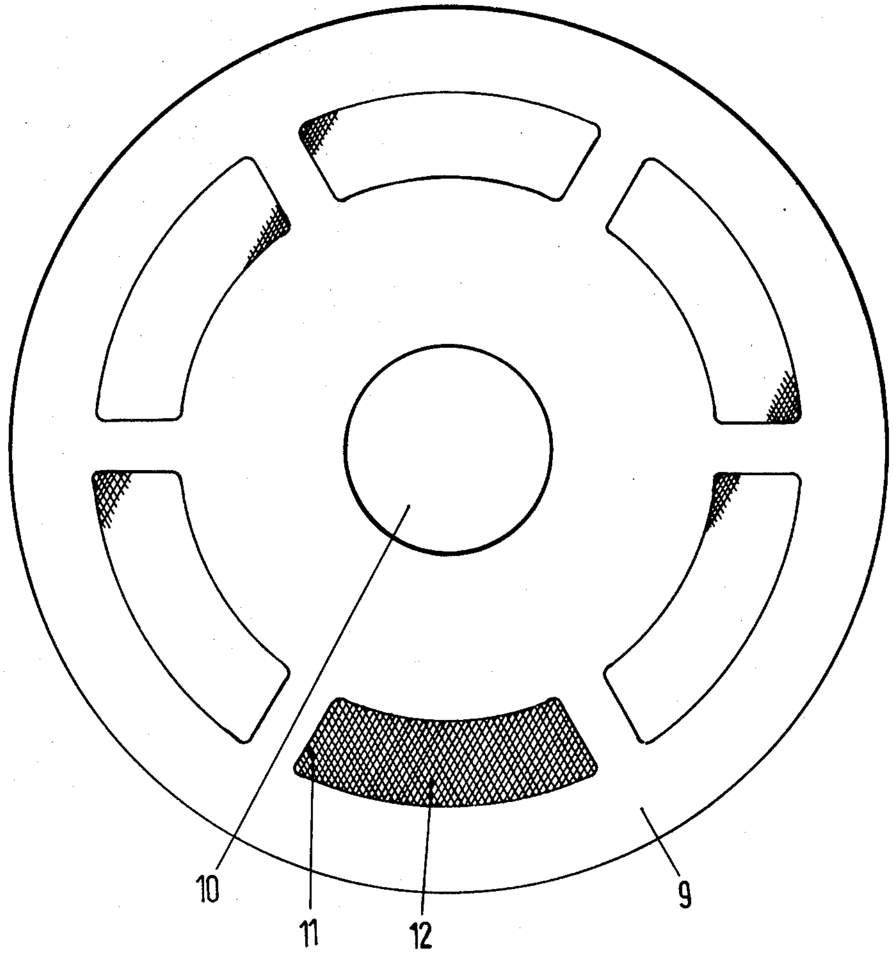
FIG. 4 is a top view of the cover for closing the centrifugal drum.

The centrifuge housing 1 has a swing back cover 2 and is provided with an inlet 3 and an outlet or discharge 4. On the cover 2 is mounted a nozzle 5. The bearing 6 carries a centrifugal drum 7 which is driven by an electric motor 8. The centrifugal drum 7 is shut off at the top by a removable cover 9, which has a round opening 10 in the center, together with a plurality of openings 11 provided with wire screen 12. The centrifugal drum 7 accommodates a removable strainer 13 which has a bottom of fine screen gauze 14.

The apparatus according to the invention functions as follows:

Through the inlet 3 contaminated liquid is pumped into the rotating centrifugal drum 7 via the round opening 10. Along the wall of the strainer 13 there is formed a liquid layer from which the insoluble dirt 15 is separated. The cleaning liquid 16 devoid of said dirt leaves the drum via openings 11 and wire screen 12. The liquid is discharged outlet 4. In order to prevent that the wire screen 12 gets clogged by fluffs 17, liquid is forced through the nozzle 5 at high pressure, the jet 18 keeping the wire screen 12 open so that fluffs do not have an opportunity of getting outside the centrifugal drum 7. The fluffs 17 are thereby forcedly precipitated against the wall of the strainer similarly as the other dirt 15.

For a specific period of time after the liquid supply has been terminated via the inlet 3, the centrifugal drum 7 continues to rotate, whereby the remaining moisture present in the deposited dirt 15 can be discharged via the wire gauze, while leaving the drum via the openings 19. By removing the strainer 13 the now dry dirt 15 can be easily discharged.

It will be clear that the invention, in addition to the elimination of the above mentioned drawbacks, has a number of other advantages.

For instance the fluid pump will suffer practically no wear through the effect of sand and other dirt; the pump circulation thus obtained enables' to proceed in smaller baths even to a so-called "no-dip" rotation, so that the cleaning effect is improved, while substantially less solvent need be distilled. There will be no sand accumulation in the liquid tanks, so that substantially less maintenanced is required than is cleaning installations that are not fitted with a separator.

I claim

1. An apparatus for removing solids from liquids comprising a centrifuge having a housing, a cover for said housing, a drum within said housing and means for rotating said drum, a strainer within said drum and having a closed casing, the strainer having a bottom comprising a screen and a top having screen openings, liquid centrifuged off leaving said drum through said screen openings, a liquid inlet extending into a central opening in the cover, a supply nozzle outside the top of the strainer and in alignment with the screen openings, and means for supplying liquid under pressure to said supply nozzle so as to wash away any solids clogging the screen openings.

2. A process for cleaning liquids employing an apparatus according to claim 1, comprising supplying liquid to said drum, rotating the drum and withdrawing cleaned liquid, and during operation discharging liquid under pressure through said nozzle so as to wash away any solids which might clog the screen openings.

* * * * *